United States Patent [19]

Kataoka

[11] Patent Number: 5,181,672

[45] Date of Patent: Jan. 26, 1993

[54] PHOTOGRAHIC FILM CASSETTE

[75] Inventor: Hideaki Kataoka, Kanagawa, Japan

[73] Assignee: Fuji Photo Film Co., Ltd., Kanagawa, Japan

[21] Appl. No.: 760,418

[22] Filed: Sep. 16, 1991

[30] Foreign Application Priority Data

Sep. 14, 1990 [JP] Japan .................................. 2-245833

[51] Int. Cl.⁵ .............................................. G03B 17/26
[52] U.S. Cl. .................................................. 242/71.1
[58] Field of Search .................... 242/71.1, 71.2, 71.7, 242/71; 354/275, 340, 341

[56] References Cited

U.S. PATENT DOCUMENTS

| | | |
|---|---|---|
| 2,336,278 | 12/1943 | Mihalyi . |
| 2,360,255 | 10/1944 | Mihalyi . |
| 2,364,381 | 12/1944 | Mihalyi . |
| 2,521,935 | 9/1950 | Monroe . |
| 2,552,200 | 5/1951 | Mihalyi . |
| 3,467,340 | 9/1969 | Rosenburgh . |
| 3,556,435 | 1/1971 | Wangerin . |
| 3,627,229 | 12/1971 | Wangerin . |
| 3,627,230 | 12/1971 | Wangerin . |
| 3,677,499 | 7/1972 | Wangerin . |
| 3,797,777 | 3/1974 | Hosono et al. . |
| 4,423,943 | 1/1984 | Gold .................... 242/71.1 |
| 4,834,306 | 5/1989 | Robertson et al. ................. 242/71.1 |
| 4,848,693 | 7/1989 | Robertson .......................... 242/71.1 |
| 4,883,235 | 11/1989 | Niedospial, Jr. .................... 242/71.1 |
| 4,962,401 | 10/1990 | Takahashi . |
| 5,003,334 | 3/1991 | Pagano et al. . |
| 5,004,176 | 4/1991 | Niedospial ......................... 242/71.1 |

FOREIGN PATENT DOCUMENTS

| | | |
|---|---|---|
| 2921379 | 11/1980 | Fed. Rep. of Germany . |
| 1306844 | 12/1989 | Japan . |
| 1306845 | 12/1989 | Japan . |

Primary Examiner—Stanley N. Gilreath
Attorney, Agent, or Firm—Sughrue, Mion, Zinn, Macpeak & Seas

[57] ABSTRACT

A photographic film cassette has a core on which a photographic filmstrip is wound, a cassette shell rotatably houses the core. A pair of disks are loosely fitted to the core, and the disks are engaged with the cassette so as to prevent rotation of the disks with the core. Each disk is formed with a circumferential lip for engagement with two opposite sides of the outermost convolution of a film roll wound on the core. A notch is formed in each circumferential lip. As the film roll rotates with the core, the film leader separated form the film roll passes through the notches. The film leader passed through the notches is then advanced out of the cassette via a film passage slit.

9 Claims, 3 Drawing Sheets

PHOTOGRAHIC FILM CASSETTE

BACKGROUND OF THE INVENTION

The present invention relates to a photographic film cassette of the type in which the leader of a photographic film is advanced out of the cassette upon rotation of the core of the cassette.

DESCRIPTION OF THE RELATED ART

It is well known that a film cassette which completely contains a photographic film (hereafter simply called a film) within the cassette in order to facilitate loading the cassette within a camera is desirable (e.g., refer to Japanese Patent Laid-open Publication Nos. 1-306844 and 1-306845). After such a film cassette is loaded within a camera, a film transport mechanism rotates the spool so that the film leader is advanced out of the cassette via its film passage mouth. The spool is constructed of a core, on which a film is wound, and a pair of vertical flanges integrally formed with the core so as to restrict the side position of a film being wound about the core. Each flange is formed with a horizontally extending circumferential lip located at the outer circumferential periphery thereof. This circumferential lip engages with the side of the outermost convolution of the film wound on the spool so that the film roll is prevented from loosening and thus rotates with the spool while the latter is rotated.

The cassette is formed with protrusions at positions proximate the film passage slit. The protrusions spread or push portions of the lips outwardly so as to disengage the lips from the film roll at positions proximate the film passage slit. The film leader enters the areas where the circumferential lips are pushed and spread, and is advanced toward the film passage slit.

In the film cassette described above, the protrusions elastically deform the circumferential lips so that the areas of the lips necessary for passing the film, as well as adjacent areas, are pushed and spread. Accordingly, the angular range of each circumferential lip where the outermost convolution of the film roll is pushed becomes narrower, resulting in a degradation of the function of preventing the film roll from being loosened, and hence such a cassette does not always reliably transmit the rotation of the spool to the roll film. Furthermore, since the circumferential lips and the protrusions are always maintained in contact with each other, the contact areas between the circumferential lips and the protrusions may be damaged when the shell halves are joined together by ultrasonic welding. The damaged portion may hook the film leader, thereby preventing a smooth advance of the film leader.

SUMMARY OF THE INVENTION

It is therefore a principal object of the present invention to provide a film cassette capable of reliably preventing the film roll from becoming loosened on the spool.

It is another object of the present invention to provide a film cassette capable of providing smooth advancement of the film leader without interference by a circumferential lip formed on spool flanges.

In order to achieve the above and other objects of the present invention, there are mounted on a core on which a film is wound, two disks or flanges each provided with a circumferential lip for preventing the film roll from being loosened. Each circumferential lip is provided with a notch through which the film, separated from the outermost turn of the film roll, passes toward the film passage mouth. The disks are fixedly mounted within the cassette so as to prevent them from rotating with the core.

According to the present invention, notches are formed in the circumferential lips at the positions through which the film passes. Therefore, the area other than the area where the notches are formed can engage with the outer turn of the film roll, thereby reliably preventing the film roll from loosening. Furthermore, protrusions to push and spread open the circumferential lips are unnecessary, thus providing a simple structure. Still further, the possibility of damage from the process of joining the shell halves together by ultrasonic wave, resulting in film obstruction, is minimized.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
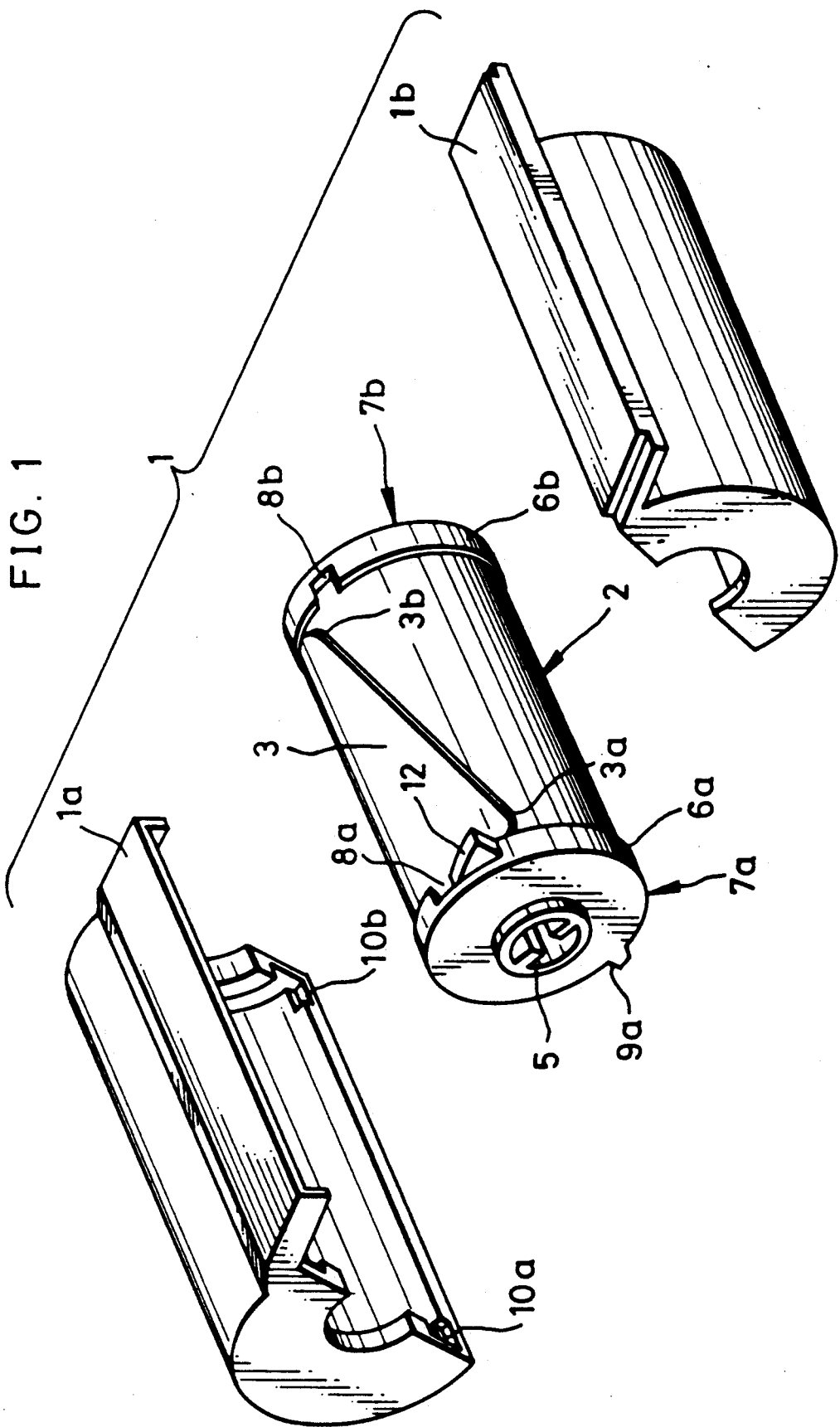
FIG. 1 is an exploded perspective view of a film cassette according to a first preferred embodiment of the present invention.

Referring to FIG. 1, cassette 1 is constructed of shell halves 1a and 1b molded from plastics, or the like. Shell halves 1a and 1b are joined together by ultrasonic welding. Plastic core 5 is rotatably housed within cassette 1. A film is wound on core 5 to form film roll 2 with the film trailer being fixed to core 5. The end of film leader 3 is cut obliquely relative to the longitudinal direction of the film. Film passage slit 4 for passing the film therethrough is formed in cassette 1 generally along the tangential line at the outermost turn of film roll 2 (see FIG. 3). As is well known, film passage slit 4 is lined with a plush material for trapping external light, the plush being omitted from the drawing for the purpose of simplification.

Figure 2:
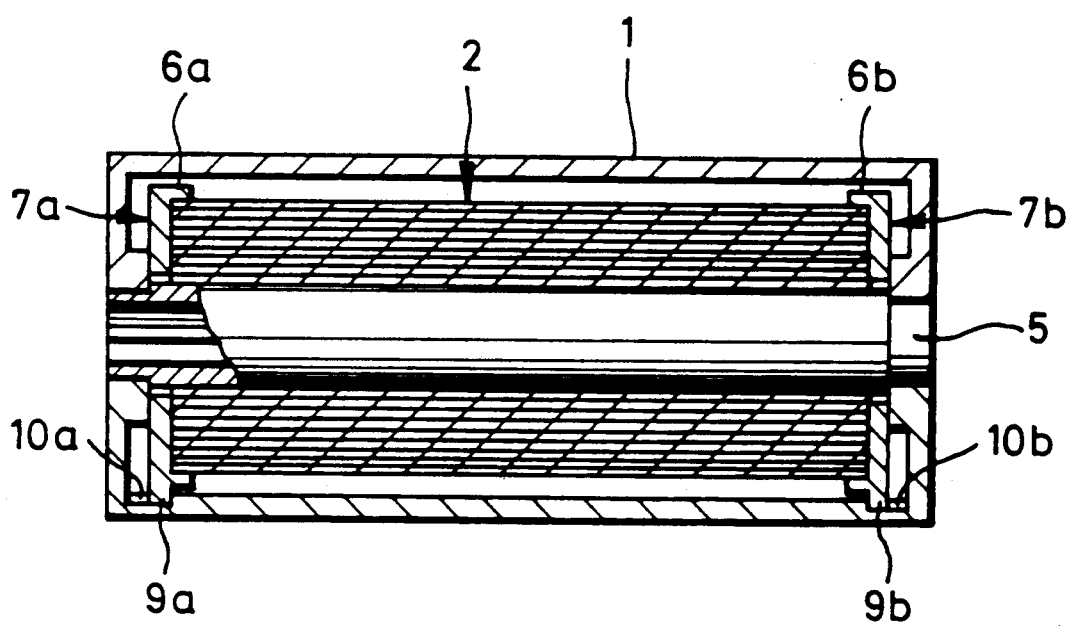
FIG. 2 is a cross sectional view of the first preferred embodiment cut in the lengthwise direction.

As shown in FIG. 2, a pair of disks 7a and 7b are loosely mounted on core 5 at opposite ends thereof. Circumferential lips 6a and 6b extending towards each other are formed at the outer circumferential peripheries of disks 7a and 7b. Circumferential lips 6a and 6b partially cover the opposite edges of the outermost convolution of film roll 2, so that the roll diameter is restricted and roll 2 is prevented from loosening.

Figure 3:
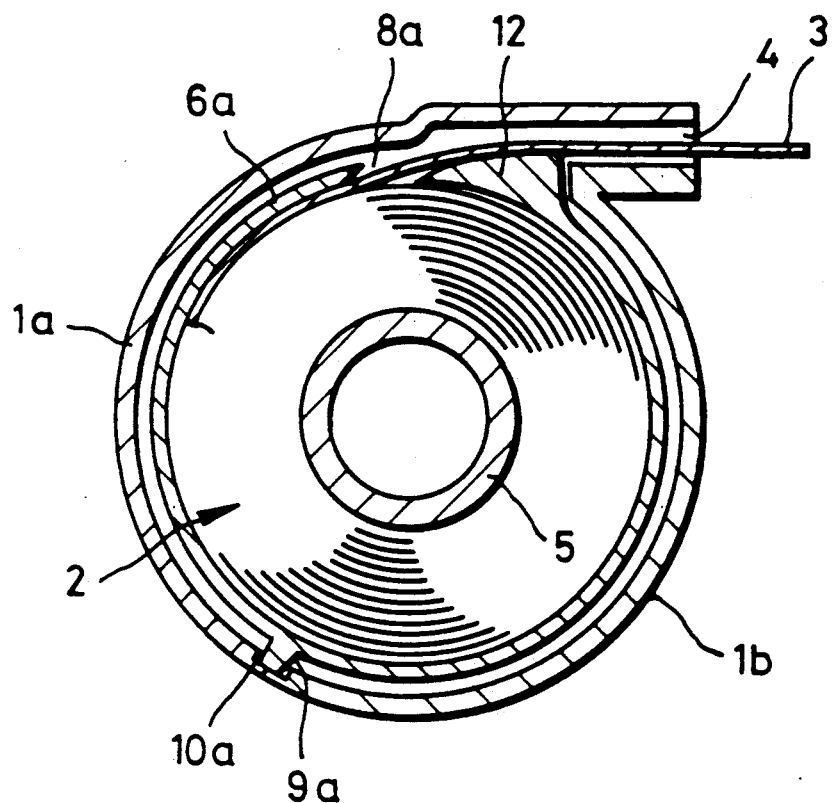
FIG. 3 is a cross sectional view of the first preferred embodiment cut in the widthwise direction.

As shown in FIG. 3, disks 7a and 7b are integrally formed with protrusions 9a and 9b which are fitted in recess portions 10a and 10b formed in the inner wall of cassette 1. Therefore, disks 7a and 7b are restricted so as not to rotate along with core 5, and not move in the axial direction of core 5. The distance between disks 7a and 7b is set equal to or slightly wider than the width of film roll 2.

Notches 8a and 8b are partially formed in circumferential lips 6a and 6b at positions proximate film passage slit 4. Guide 12 for guiding the film is formed integrally with circumferential lip 6a at the position near notch 8a. Guide 12 is formed in the shape of a claw at its one end so as to peel off one side 3a of film leader 3 from the outermost turn of film roll 2. Since disks 7a and 7b do not rotate, the end surfaces and outermost turn surface of film roll 2 are in sliding contact with the side surfaces of disks 7a and 7b and the circumferential lips 6a and 6b when core 5 is rotated. In order to keep the friction caused by the slide contact as small as possible and to allow a smooth rotation of film roll 2, it is preferable to construct disks 7a and 7b of polyacetals, nylon, fluoroplastics, or the like.

Next, the operation of the above-described embodiment will be described. Film leader 3 is initially completely housed within cassette 1 and restricted by circumferential lips 6a and 6b. As core 5 is rotated in the unwinding direction, film roll 2 rotates with core 5 without loosening because the outermost convolution of film roll 2 is restricted by circumferential lips 6a and 6b. On the other hand, since disks 7a and 7b are stationary relative to cassette 1, notches 8a and 8b always maintain the same positions even when core 5 rotates.

As film roll 2 rotates with core 5, protruding side 3a of film leader 3 reaches notch 8a. At this time, side 3a is separated from film roll 2 by the end portion of guide 12, and is directed through notch 8a. Side 3a is guided toward film passage slit 4 by guide 12. As film roll 2 further rotates, side 3b of film leader 3 will advance out of notch 8b. After passing through notches 8a and 8b, film leader 3 is advanced out of cassette 1 via film passage slit 4.

Film leader 3 is then caught by the outer circumference of a film take-up reel in the camera (not illustrated). Thereafter, core 5 becomes free, and the film is pulled farther out of cassette 1 by the rotation of the film take-up reel.

Figure 4:
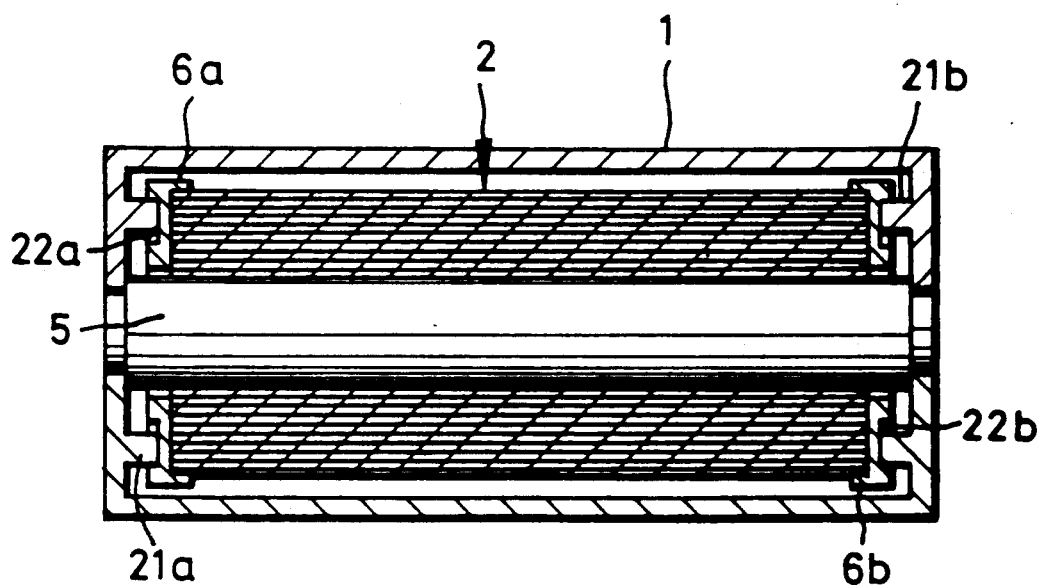
FIG. 4 is a cross sectional view of a second preferred embodiment of the present invention cut in the lengthwise direction.

In the second embodiment, shown in FIG. 4, protrusions 21a and 21b extending toward disks 6a and 6b are formed on the inner side walls of cassette 1. Protrusions 21a and 21b are fitted into recess portions 22a and 22b formed in the outer surfaces of disks 7a and 7b, so as to prevent disks 7a and 7b from rotating.

In the above embodiments, guide 12 and circumferential lip 6a are integrally formed. However, it is understood that guide 12 may be formed integrally with shell half 1b. Furthermore, the end of film leader 3 may be cut perpendicular to the longitudinal direction of the film.

Although the present invention has been fully described by way of the preferred embodiments thereof with reference to the accompanying drawings, various changes and modifications may be made thereto without departing from the scope of the present invention, as recited in the appended claims.

What is claimed is:

1. A photographic film cassette comprising:

a cassette shell having a film passage slit formed thereon;

a core on which a film roll is coiled, said core being contained within said cassette shell;

a pair of disks rotatably fitted on said core, said disks being fixed in position within said cassette shell so as not to be rotated when said core is rotated;

a circumferential lip formed on each of said disks at an outer circumferential periphery, said lips being engaged with an outermost turn of said film roll while said core is rotated in a direction of unwinding, such that said film roll is rotated along with said core without loosening said film roll in order to advance a leader of said film roll through said film passage slit to an exterior of said cassette shell; and notches formed in said lips, proximate said film passage slit, such that said film leader, separated from said film roll, passes through said notches toward said film passage slit when said core is rotated in a direction of unwinding.

2. A photographic film cassette according to claim 1, wherein said cassette shell comprises a pair of shell halves molded from a plastic material.

3. A photographic film cassette according to claim 2, wherein said film passage slit is positioned substantially along a line tangential to said outermost convolution of said film roll.

4. A photographic film cassette according to claim 3, wherein an end of said film leader is slanted relative to a longitudinal direction of said film roll.

5. A photographic film cassette according to claim 3, further comprising:

a guide for guiding at least one side of said film leader passed through said notches toward said film passage slit.

6. A photographic film cassette according to claim 5, wherein said guide is mounted on said lips.

7. A photographic film cassette according to claim 6, wherein said guide has a claw at an end thereof, said claw separating said film leader from said film roll when said core is rotated in a direction of unwinding.

8. A photographic film cassette according to claim 7, further comprising:

protrusions formed on outer circumferential peripheries of said disks and extending in a radial direction thereof;

said cassette shell having recesses formed in an inner wall thereof;

said protrusions being fitted into said recesses so as to prevent motion of said core in an axial direction and rotation of said disks with respect to said cassette shell.

9. A photographic film cassette according to claim 7, further comprising:

recess portions formed in the outer side walls of said disks; and protrusions formed in said cassette shell, said protrusions being engaged with said recess portions so as to prevent rotation of said disks relative to said cassette shell.

* * * * *